United States Patent [19]

Gray et al.

[11] 4,232,493
[45] Nov. 11, 1980

[54] FIRE-RESISTANT ELECTRICAL WIRING DISTRIBUTING FLOOR STRUCTURE AND METHOD

[75] Inventors: Charles R. Gray, Coraopolis; John O. Hazen, Monaca; Charles J. Kelly, Pittsburgh, all of Pa.

[73] Assignee: H. H. Robertson Company, Pittsburgh, Pa.

[21] Appl. No.: 901,063

[22] Filed: Apr. 28, 1978

[51] Int. Cl.³ .............................................. E04C 3/10
[52] U.S. Cl. ........................................ 52/221; 52/1; 52/232
[58] Field of Search ............... 52/232, 220, 221, 1, 52/21

[56] References Cited

U.S. PATENT DOCUMENTS

| 1,746,625 | 2/1930 | White | 52/232 |
|---|---|---|---|
| 2,016,382 | 10/1935 | McBurney | 52/594 |
| 2,142,165 | 1/1939 | Young | 52/232 |
| 2,167,208 | 7/1939 | Hilpert | 52/220 |
| 2,909,915 | 10/1959 | Kennedy | 52/221 |
| 3,855,741 | 12/1974 | Seman | 52/232 |
| 3,932,696 | 1/1976 | Fork | 52/232 |
| 3,973,366 | 8/1976 | Blane | 52/221 |
| 3,995,102 | 11/1976 | Kohaut | 52/232 |
| 4,061,344 | 12/1977 | Bradley | 52/232 |

FOREIGN PATENT DOCUMENTS

| 548322 | 6/1956 | Belgium | 52/220 |
|---|---|---|---|
| 2535309 | 2/1977 | Fed. Rep. of Germany | 52/21 |
| 996030 | 12/1951 | France | 52/598 |
| 2254182 | 7/1975 | France | 52/232 |
| 423919 | 5/1967 | Switzerland | 52/21 |

Primary Examiner—James A. Leppink
Assistant Examiner—Henry E. Raduazo
Attorney, Agent, or Firm—George E. Manias

[57] ABSTRACT

A floor structure comprising a metal subfloor including metal cellular units providing plural enclosed cells; housings associated with certain of the cells, each adapted to provide future access to different electrical services at one location in the floor structure; a covering layer of monolithic concrete covering the subfloor and the housing, and a layer of fireproofing material covering the lower face of the metal subfloor. Activating means is provided establishing access to the enclosed cells through the housing without significantly reducing the desired fire endurance of the floor structure and without increasing the thickness of the layer of fireproofing material. The fireproofing material has a thickness which is less than that required to provide the floor structure with a desired fire endurance when the housing is activated. A method is disclosed for establishing access to the enclosed cells through the inert while maintaining the fire endurance capability of the floor structure.

12 Claims, 24 Drawing Figures

FIRE-RESISTANT ELECTRICAL WIRING DISTRIBUTING FLOOR STRUCTURE AND METHOD

BACKGROUND OF THE INVENTION

1. Field of the Invention

This invention concerns a fire-resistant, metal subfloor/concrete floor structure incorporating inactive electrical housings, and more particularly method and apparatus for activating an underfloor electrical housing without significantly reducing the fire endurance of the floor structure.

2. Description of the Prior Art

Floor structures particularly adapted for distributing electrical wiring are known which comprise, for example, a metal subfloor including metal cellular units providing enclosed wire carrying cells, a covering layer of concrete, and one or more access housings positioned above the metal cellular units but below the upper surface of the covering layer of concrete. Each housing provides a chamber communicating with at least one of the cells. Each of the access housings may be activated by removing a portion of the covering layer of concrete and installing an activating assembly, thereby to provide ready access to the interior of the chamber and, hence, to the various electrical services at one location in the floor structure. Typical examples of such floor structures and of activating assemblies will be found in U.S. Pat. Nos. 3,303,264 (SAUL et al); 3,609,210 (GURITZ); 3,701,837 (FORK); 3,932,696 (FORK et al).

The use of intumescent material of the type adapted, under fire conditions, to foam and expand has been suggested as a means to fill the interior of the housing with a fire-resistant char, see U.S. Pat. Nos. 3,864,883 (McMARLIN); 3,932,696 (FORK et al). The McMARLIN and FORK et al references neither illustrate nor discuss external fireproofing applied to the lower surface of the metal subfloor.

The use of fireproofing material within insertion-type mountings for electrical outlets which are commonly used in poke-thru systems also is known. See, for example, U.S. Pat. No. 3,803,341 (KLINKMAN) and a publication by ABRAMS et al, Fire Tests of Poke-Thru Assemblies (RD008.D1B) 1971, Portland Cement Association, Skokie, Ill. 60076.

SUMMARY OF THE INVENTION

The principal object of this invention is to provide apparatus and method for activating an underfloor access housing without significantly reducing the fire endurance of the floor structure; or in the alternative, which permits the external layer of fireproofing material to be applied to the undersurface of the metal subfloor at a significantly reduced thickness.

Another object of this invention is to provide apparatus and method for activating an underfloor access housing while simultaneously and reliably eliminating the abovedescribed "heat path".

A further object of this invention is to provide improved means for positively securing a rigid insulation block to the lower face of a cover thereby to preclude detachment of the rigid insulation block during fire conditions and the consequent reduction in the floor fire endurance.

Still another object of this invention is to provide an improved fireproofing arrangement for an activated underfloor access housing.

The present invention provides improvements in the fireproofing of floor structures of the type adapted to distribute the wiring of different electrical services throughout the floor structure. The floor structure is of the type which comprises a metal subfloor including metal cellular units which provide generally parallel enclosed wire-carrying cells; a covering layer of monolithic concrete supported by the metal subfloor; a layer of fireproofing material covering the lower face of the metal subfloor; and a housing disposed between the subfloor and the covering layer of concrete and communicating with at least one of the enclosed cells.

The present improvement comprises activating means which provides access to the chamber from an upper surface of the floor structure through the concrete without significantly reducing the desired fire endurance of the floor structure and without increasing the thickness of the layer of fireproofing material. The layer of fireproofing material has a thickness which is less than that required to provide the floor structure with a desired fire endurance when the housing is activated. In a first embodiment the activating means includes, in general, a passageway formed in the concrete above the housing which establishes access to the chamber from the upper surface of the floor structure. Closure means including a removable cover is supported in capping relation with the passageway. An insulation block is provided which is carried by the cover at a lower face thereof. The insulation block provides a fire-resistance approximating the fire-resistance of the concrete removed to form the passageway.

The present invention also provides alternative activating means particularly suited for use in an access housing of the type which incorporates a trough space as part of the chamber. The trough space comprises a portion of a lengthwise trough separating adjacent enclosed cells. Such an access housing is disclosed, for example, in U.S. Pat. No. 3,932,696 (FORK et al). In a second embodiment, the activating means includes a heat shield formed from a rigid insulation, which is placed in the trough space prior to installing the cover. The heat shield cooperates with the rigid insulation block carried by the cover to provide a fire-resistance approximating the fire-resistance of the concrete removed to form the passageway.

The present invention also provides a method of activating an underfloor electrical housing residing between a metal subfloor and a covering layer of monolithic concrete of a floor structure without reducing the desired fire endurance of floor structure, and wherein the housing communicates with at least one enclosed cell of a metal subfloor, and wherein a layer of fireproofing material covers the lower face of the metal subfloor and has a thickness which is less than that required to provide the floor structure with a desired fire endurance when the housing is activated. The present method includes the steps of removing a segment of the concrete above the housing to provide a passageway establishing access to the interior of the housing from the upper surface of the floor structure; reinstating the desired fire endurance of the floor structure without increasing the thickness of the layer of fireproofing material by: affixing closure means to the floor structure in capping relation with the passageway; affixing an insulation block to a lower face of the closure means.

DESCRIPTION OF THE PREFERRED EMBODIMENT(S)

Figures 1, 2:
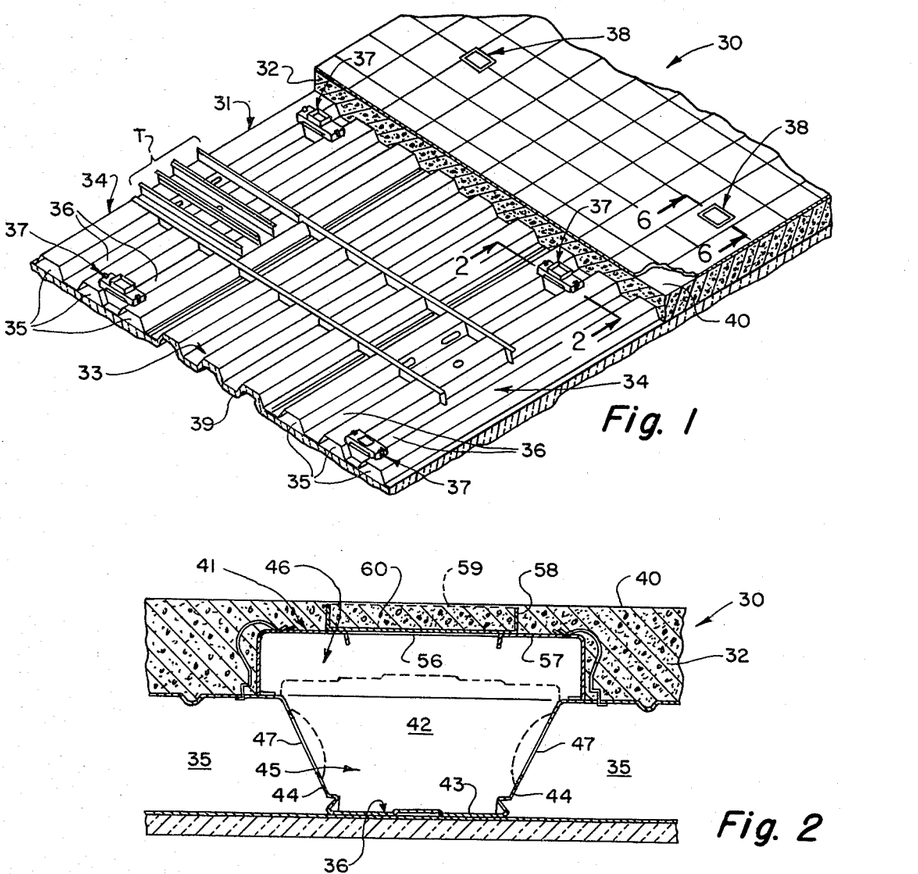
FIG. 1 is a fragmentary isometric view of an improved fire-resistant floor structure of this invention.
FIG. 2 is a fragmentary cross-sectional view, taken along the line 2—2 of FIG. 1, illustrating an underfloor access housing prior to activation.

FIG. 1 illustrates a floor structure 30 comprising a metal subfloor 31 and a covering layer of monolithic concrete 32. The metal subfloor 31 may include non-cellular metal decking units 33 and metal cellular decking units 34 which are comingled in a preselected pattern to allow for present and future distribution of electrical services throughout the floor structure 30. If desired, the metal subfloor 31 may include only the metal cellular decking units 34. The decking units 33 and 34 may comprise those units disclosed in U.S. Pat. No. 3,812,636 issued May 28, 1974, and assigned to the assignee of the present invention.

The metal cellular flooring units 34 provide plural, generally parallel, enclosed cells 35 separated by lengthwise troughs 36. The cells 35 distribute the electrical wiring of different electrical services throughout the floor structure 30. The floor structure 30 may incorporate an underfloor electrical trench-forming assembly, parts of which are illustrated at T. The trench-forming assembly T may comprise the assembly disclosed in U.S. Pat. No. 3,721,051 issued Mar. 20, 1973, and assigned to the assignee of the present invention.

Underfloor access means 37 is provided at selected locations in the metal subfloor 31, prior to pouring the concrete 32. Each of the access means 37 provides present and future access to the different electrical services at one location in the finished surface of the floor structure 30. After the concrete 32 has hardened, selected ones of the access housings 37 may be activated by installing activating means 38 of this invention. As will hereinafter be described, activation of any one or all of the access means 37 is accomplished without significantly reducing the fire endurance of the floor structure 30.

The floor structure 30 must have an adequate fire endurance, that is, the capability of containing a fire burning, for example, in the space below the floor structure 30. The fire must be contained for a period of time sufficient to permit the building occupants to move safely out of the building. The fire containment time is commonly referred to as the fire rating and is expressed as "2-hour", "½-hour", et cetera. The fire rating of the floor structure 30 is increased by providing a layer of external fireproofing material 39 disposed in covering relation with the undersurface of the metal subfloor 31. The fireproofing material 39 is a significant factor in the overall cost of the floor structure 30. The fireproofing material 39 may comprise the type which is field-sprayed directly onto the undersurface of the metal subfloor 31 as illustrated in the drawings, and gypsum board or other membrane such as a fire-rated suspended ceiling.

The thickness of the external fireproofing material 39 is determined in part by the fire-resistance of the floor structure components as a whole; and in part by the end-use condition of the floor structure. Thus, the floor structure 30 may exist in one of two distinct conditions.

In Condition I, the covering layer of concrete 32 is intact, i.e., none of the underfloor access housings 37 have been activated. No "heat path" exists through which heat may be readily transmitted through the floor structure 30.

In Condition II, one or more of the underfloor access housings 37 are activated, i.e., access is established to the wire carrying cells 35 from the concrete upper surface 40 of the floor structure 30. Activation of the underfloor access housings 37 creates a substantially unobstructed "heat path" through which heat may be readily transmitted through the floor structure 30.

To achieve a selected fire rating when the floor structure 30 is in Condition I, the external fireproofing 39 may be provided in a first thickness. To obtain the same selected fire rating when the floor structure is in Condition II, the external fireproofing 39 must be provided at a second thickness which is greater than the first thickness in order to negative the effects of the "heat path".

It is a normal industry practice to provide the layer of external fireproofing 39 at the second or greater thickness, notwithstanding the fact that the floor structure 30 may be in Condition I for an extended period of time.

In accordance with this invention and contrary to prior practices, the external fireproofing material 39 is provided in the first thickness, that is, in a thickness which is less than that required to provide the floor structure 30 with the desired fire endurance or selected fire rating when one or more of the housings 37 are activated. Thus, one important advantage of this invention is that significant economies in the cost of the external fireproofing material 39 as well as the cost of applying the same are achieved.

ACCESS MEANS 27: There are two general types of underfloor access means in common use today.

In a first type, a housing 41 (FIG. 2) has cooperating closure elements 42 (only one visible) which extend downwardly into the lengthwise trough 36 thereby excluding the concrete 32. The closure elements 42 may comprise elements separate from the housing 41 or may be formed integrally with the housing 41. The closure elements 42 cooperate with a valley 43 and the adjoining webs 44 to define a trough space 45. The trough space 45 cooperates with the interior of the housing 41 to provide a chamber 46. The chamber 46 communicates with each of the adjacent cells 35 through openings 47 provided in the webs 44. For a more complete description of this first type of access means, reference is directed to U.S. Pat. No. 3,932,696 (FORK et al) which is incorporated herein by reference.

Figure 7:
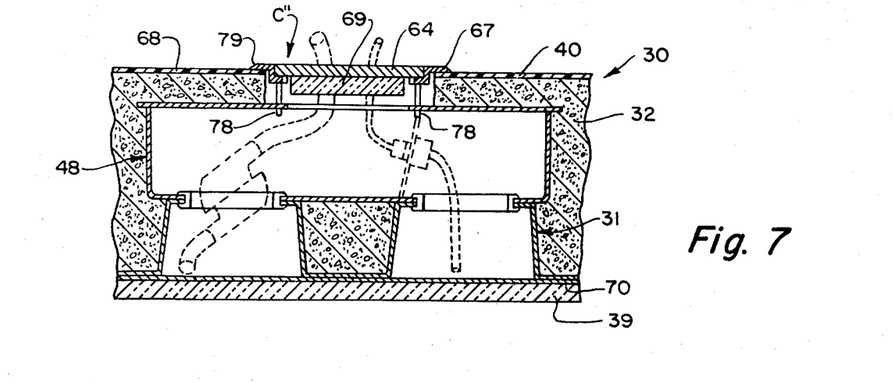
FIG. 7 is a fragmentary cross-sectional view illustrating activating means installed in the housing of FIG. 3.

In a second type, a housing 48 (FIG. 3) is associated with a cellular decking unit 49. The housing 48 provides a chamber 50 disposed entirely above the crests 51 of adjacent cells 52. Concrete 32' fills the trough 53 presented between the adjacent cells 52 and extends beneath the housing 48. The chamber 50 communicates with the cells 52 through openings 54 formed in the housing bottom wall 55 and in the crests 51. The openings 54 are grommeted as shown in FIG. 7, during activation of the housing 48. For a more complete description of this second type of access means, reference is directed to U.S. Pat. No. 3,701,837 (FORK), which is incorporated herein by reference.

Figure 3:
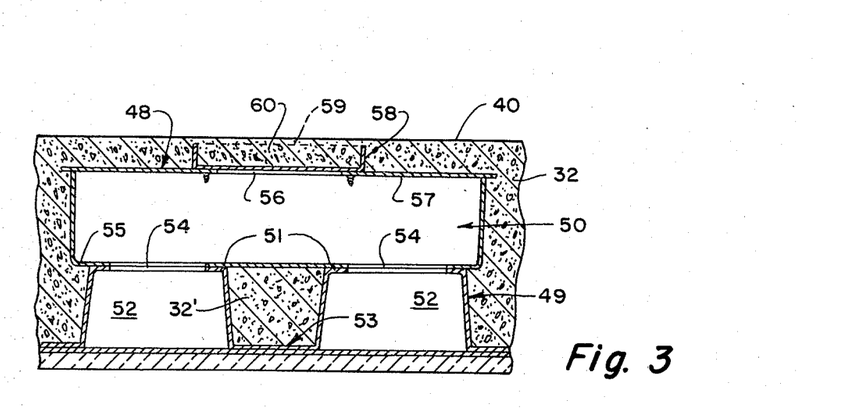
FIG. 3 is a view, similar to FIG. 2, illustrating a second type of underfloor access housing.

Access to the housing interior normally is provided by an opening adjacent to the top of the housing. In the case of the housings 41, 48, an outlet opening 56 is provided in the top wall 57. A protective cap 58 precludes ingress of the concrete 32 into the interiors of the housings 41, 48. The protective cap 58 presents an upper peripheral edge 59 proximate to the concrete upper surface 40, which facilitates removal of the protective cap 58 and that concrete portion 60 disposed within the protective cap 58.

Figure 4:
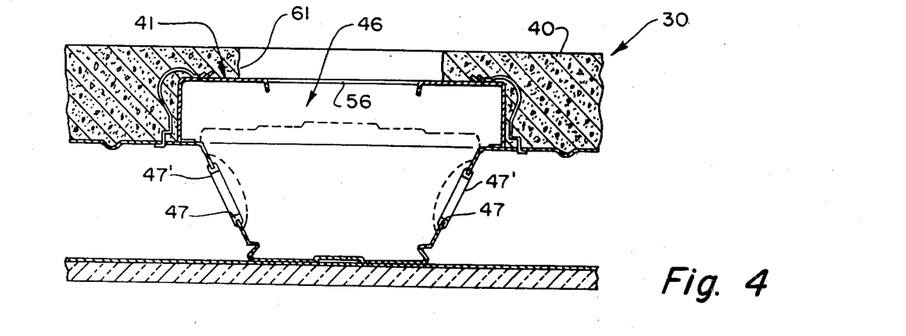
FIG. 4 is a view, similar to FIG. 2, illustrating the first step in activating the underfloor access housing.

HOUSING ACTIVATION: In accordance with a first embodiment of this invention, the housing 41, for example, is activated by removing the concrete segment 60 and the protective cap 58 to provide a passageway 61 (FIG. 4) establishing access to the chamber 46 from the concrete upper surface 40. A plastic grommet 47' is installed in each of the openings 47 to protect the wiring pulled through the openings 47.

Figures 5, 6:
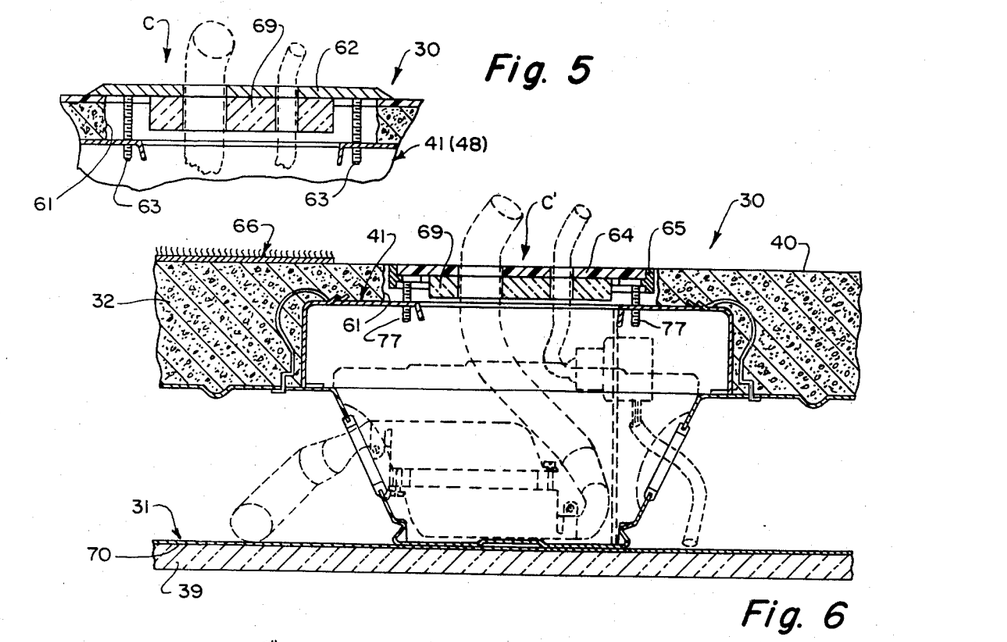
FIG. 5 is a fragmentary cross-sectional view illustrating closure means affixed to the floor structure.
FIG. 6 is a fragmentary cross-sectional view taken along the line 6—6 of FIG. 1, illustrating activating means installed in the housing of FIG. 2.

Activation continues as shown in FIGS. 5 to 7 by affixing the closure means C to the floor structure 20 in capping relation with the passageway 61. The closure means C (FIG. 5) may comprise a cover 62 releasably secured to the housing 41(48), for example, by positive fasteners 63. The closure means C' (FIG. 6) includes a removable cover 64; and support means such as a support ring 65 disposed within the passageway 61 and supporting the cover 64 substantially flush with the concrete upper surface 40. The closure means C' is particularly useful where carpeting 66 constitutes the decorative covering for the concrete upper surface 40. The closure means C" (FIG. 7) includes the removable cover 64; and support means, such as a flange ring 67. The closure means C" is useful where vinyl tile 68 constitutes the decorative cover for the concrete upper surface 40.

Activation continues by affixing an insulation block 69 to the lower face of the cover 62(64). The insulation block 69 may be secured to the cover 62(64) prior to installing the closure means C, C', C" and thus cannot be inadvertently omitted during installation.

Further in accordance with this invention, the layer 39 of fireproofing material is applied to the lower face 70 (FIGS. 6, 7) of the metal subfloor 31 in a thickness which is less than that required to provide the floor structure 30 with a desired fire endurance or selected fire rating when the housing 41 is activated.

INSULATION BLOCK: In accordance with this invention, the insulation block 69 may comprise any type of insulating material capable of providing a fire-resistance approximating the fire-resistance of the concrete segment 60 which is removed when forming the passageway 61. A suitable insulation material comprises an intumescent composition such as disclosed in U.S. Pat. No. 3,864,883 (McMARLIN). Such an insulation material is adapted to foam and expand, under fire conditions, to yield a stable incombustible mass which seals the passageway 61 against passage of heat and smoke. The insulation block 69 is adhered or otherwise secured to the lower face of the cover 62(64).

Figures 8, 9, 10, 11, 12:
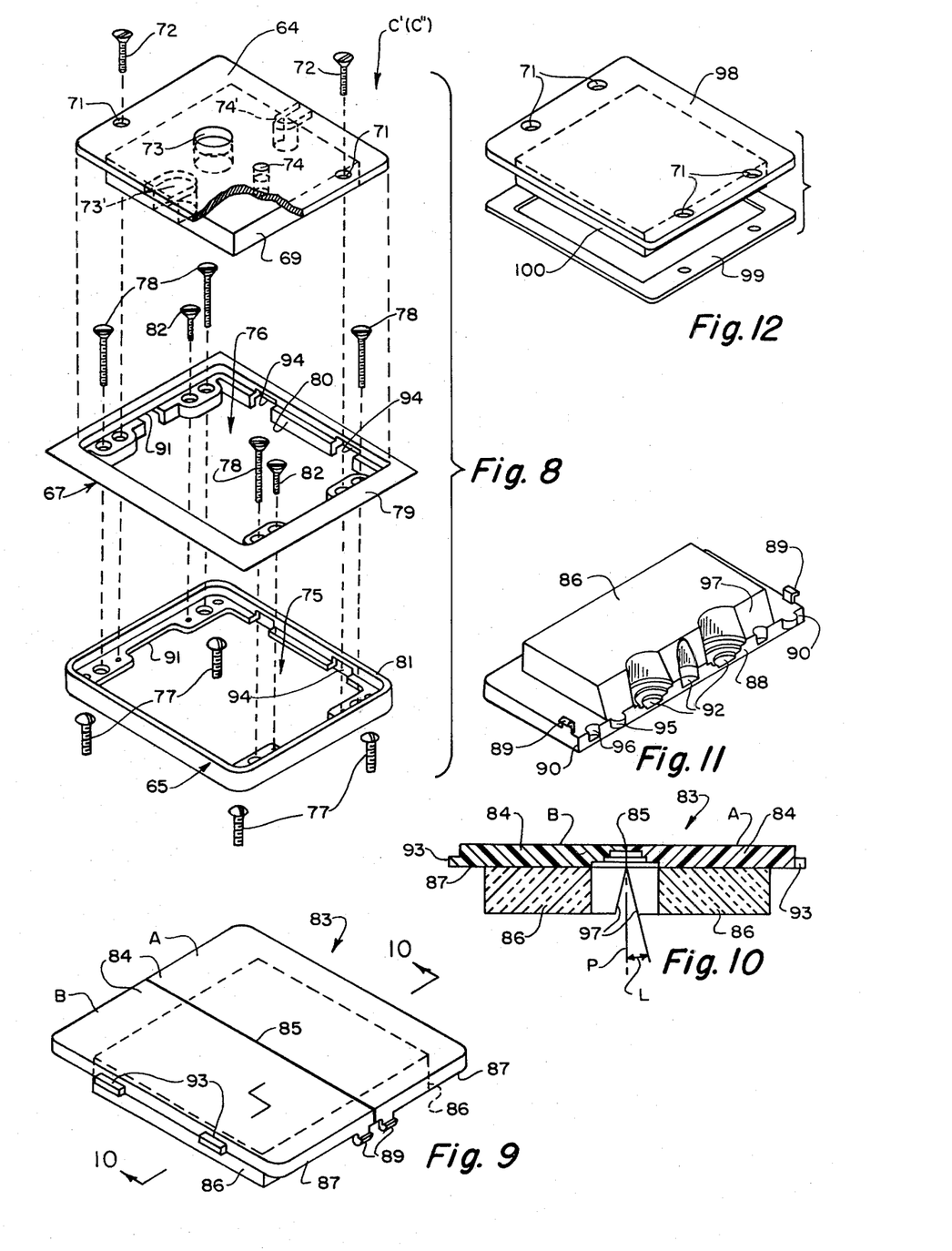
FIG. 8 is an exploded isometric view of an activating assembly.
FIG. 9 is an isometric view of a two-piece insulated cover plate forming part of the present activating means.
FIG. 10 is a cross-sectional view taken along the line 10—10 of FIG. 9.
FIG. 11 is an isometric view further illustrating one-half of the cover plate of FIG. 9.
FIG. 12 is an exploded isometric view illustrating an abandoning assembly.

FIG. 8 illustrates the components of the cover means C' and C".

The cover 64 may be formed from metals or fire-resistant plastics. Countersunk openings 71 adjacent the periphery receive cover hold-down screws 72 for securing the cover 64 to the support ring 65 or to the flange ring 67. Openings 73, 74 may be provided in the central portion of and extend through the cover 64, thereby to provide for passage of electrical wiring as shown in FIG. 6. Alternatively, openings 73', 74' may be provided along the opposite edges of the cover 64. When the insulation block 69 is formed from an intumescent composition, such as identified above, the openings 73, 74 (73', 74') may also extend through the insulation block 69. During fire exposure, the insulation block 69 expands and seals the annular space between the wiring and the walls of the openings 73, 74 (73', 74'). The length and width of the insulation block 69 are such that the block 69 may extend downwardly through the access opening 75 or 76 presented by the rings 65, 67.

Referring to FIG. 6, the support ring 65 is supported on the heads of levelling screws 77 which are threadedly engaged with the housing 41. Ring hold-down screws 78 are provided to secure the support ring 65 to the housing 41 in flush relation with the concrete upper surface 40.

Referring to FIGS. 7 and 8, the flange ring 67 does not employ the levelling screws 77, inasmuch as the perimeter flange 79 thereof overlies the vinyl tile 68. The hold-down screws 78 are used to secure the flange ring 67 to the housing 48.

Some installations may necessitate the use of the flange ring 67 in conjunction with the support ring 65.

The flange ring 67 has a perimeter base 80 adapted to fit within the upstanding perimeter wall 81 of the support ring 65. Attachment screws 82 secure the flange ring 67 to the support ring 65.

Alternatively, a cover 83 (FIGS. 9 and 10) may be provided which is formed in two pieces, that is, two half parts A, B comprising substantially flat members 84 engaged along a joining line 85. An insulation block 86 is secured to the lower face 87 of each of the flat members 84.

The flat members 84 may be formed from any suitable heat-resistant moldable plastic materials capable of withstanding temperatures of up to about 400° F. (204° C.). Examples of suitable plastic materials include acetal resin compositions, thermoplastic polyester compositions and the like.

FIG. 11 illustrates either of the flat members 84. The flat member 84 presents a mating flat wall 88 mateable with a like wall on the other flat member. Releasable locking means in the form of locking elements 89 are provided along the peripheral wall, preferably adjacent to each of the mating flat wall ends 90. The locking elements 89 are adapted to engage a lower face 91 (FIG. 8) presented by each of the rings 65, 67, thereby locking the flat member 84 to the rings 65, 67. The flat member 84 may be provided with at least one and preferably a plurality of weakened areas 92 which extend inwardly from the mating flat wall 88. The weakened areas 92 define knockouts which may be removed in the field to provide passageways for electrical wiring exiting from the housings 41, 48 (FIGS. 6, 7) to the space above the floor structure 30. When the insulation block 86 is formed from an intumescent composition, such as identified above, grooves may be cut in the flat face 97 as shown in FIG. 11 to expose the weakened areas 92. Lugs 93 extending outwardly from the flat member 84 are positioned to engage recesses 94 (FIG. 8) provided in the rings 65, 67 and to cooperate with the locking element 89 in retaining the flat members 84 within either of the rings 65, 67. As shown in FIG. 11, the flat member 84 presents alternating tongues 95 and complementary grooves 96 in the region of the mating flat wall 88. When the two flat members 84 are joined as shown in FIG. 9, they are connected by tongue and groove connections (not visible) provided by the tongues 95 and grooves 96.

When the cover 83 of FIGS. 9 through 11 is removed from either of the rings 65, 67, the half parts A, B pivot about the lugs 93, while the mating flat walls 88 move upwardly and away from each other. As best shown in FIGS. 10 and 11, each of the insulation blocks 86 presents a flat face 97 which is inclined outwardly from the plane P of the mating flat wall 88 at an angle L (FIG. 10) of at least 14 angular degrees. The diverging flat faces 97 preclude interference by the individual insulation block 86 when the half parts A, B are raised.

Occasionally it is necessary or desirable to deactivate the housing 41(48) because it is no longer needed. Once all electrical connections have been broken, the perforated cover 64(83) is replaced by a new and imperforate cover 64(83) having the insulation block 69(86) attached; or by an abandoning assembly such as illustrated in FIG. 12. The abandoning assembly comprises a plate 98 having countersunk openings 71 positioned to receive the hold-down screws 72 (FIG. 8); a gasket 99 when needed; and an insulating block 100 secured to the lower face of the plate 98.

A second embodiment of the activating means of this invention will now be described with reference to FIGS. 13 to 24. Corresponding numerals will be employed to identify corresponding parts heretofore described.

The activating means 101 (FIG. 13) is particularly suited for use with the housing 41. Once the passageway 61 has been formed as explained above, activation continues by introducing a heat shield 102 (FIGS. 13, 14) into the trough space 45, i.e., between the closure elements 42 and the webs 44. The heat shield 102 overlies and preferably covers substantially entirely all of the upper face of the valley 43. The heat shield 102 preferably is formed from those non-combustible rigid insulation materials which contain chemically combined water. During fire exposure, the chemically combined water is released and tends to cool the upper regions of the chamber 46. Examples of suitable fire-resistant materials include standard gypsum wallboard, cast gypsum blocks and the like.

Activation continues by affixing one of the closure means C, C', or C'' of FIGS. 5 to 7 in capping relation with the passageway 61. The closure means C' is shown for the purpose of this description. The closure means C' may include a removable cover 64' and the support ring 65.

Figure 13:
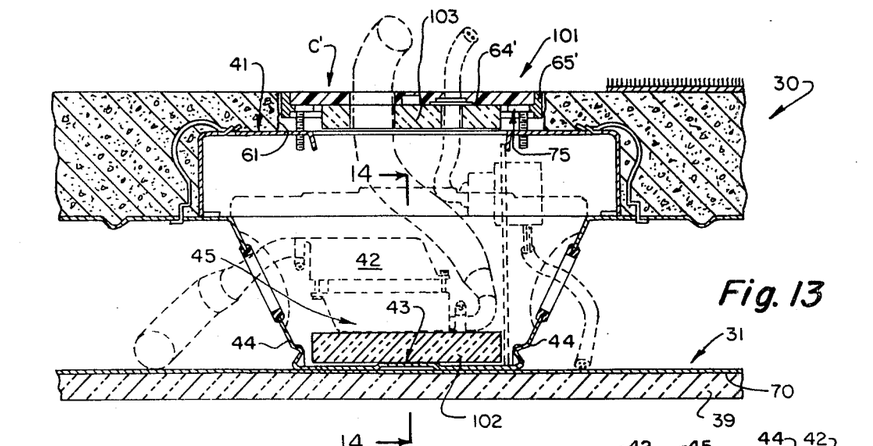
FIG. 13 is a view, similar to FIG. 6, illustrating alternative activating means.
Figure 14:
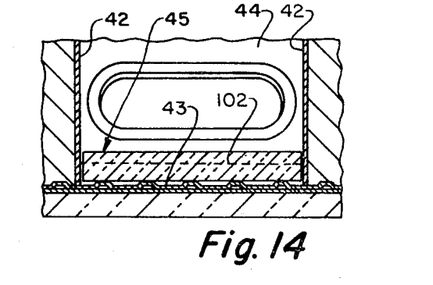
FIG. 14 is a fragmentary cross-sectional view taken along the line 14—14 of FIG. 13.
Figure 15:
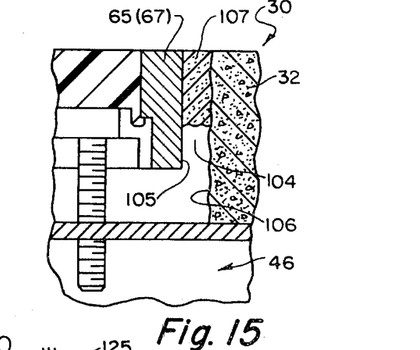
FIG. 15 is a fragmentary cross-sectional view illustrating a detail of the installation of the present activating means.
Figure 16:
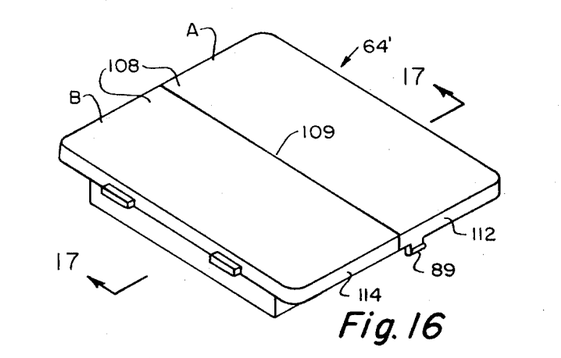
FIG. 16 is an isometric view of a two-piece insulated cover plate forming part of the present activating means.

Activation continues by affixing a rigid insulation block 103 to the lower face of the cover 64'. The insulation block 103 preferably is secured to the lower face of the cover 64' by a dovetail connection or a positive fastener as will hereinafter be described. The insulation block 103 preferably is formed from rigid, non-combustible materials of the type which are machineable and/or capable of threaded connections. The rigid insulation block 103 may comprise a rigid glass fiber board having, for example, a density of 18 pounds per cubic foot. The insulation block 103 may also be formed from heat-insulating materials such as gypsum, compressed perlite-type insulation, and the like.

Further in accordance with this invention, the layer 39 of fireproofing material is applied to the lower face 70 of the metal subfloor 31 in a thickness which is less than that required to provide the floor structure 30 with a desired fire endurance when the housing 41 is activated.

When the support ring 65 and the flange ring 67 are installed, a space 104 (FIG. 15) is presented between the perimeter face 105 of the ring 65(67) and the confronting peripheral wall 106 of the concrete 32. Occasionally the concrete portion 60 (FIG. 2) will not break out cleanly and, as a result, the space 104 is relatively large. Grouting 107 may be applied to seal the space 104 thereby to preclude egress of heat and smoke from the chamber 46 into the space above the floor structure 30.

The cover plate 64' (FIGS. 16 and 17) may be formed in two pieces, that is, two half parts A, B comprising substantially flat members 108 engaged along a joining line 109. The rigid insulation block segment 103 (FIG. 17) confronts the lower face 110 of each flat member 108 and is secured thereto by securing means 111.

Figure 17:
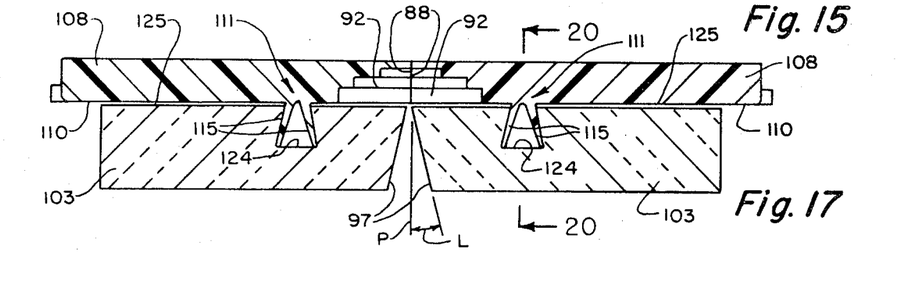
FIG. 17 is a cross-sectional view taken along the line 17—17 of FIG. 16.
Figures 18, 19, 20, 21, 22, 23, 24:
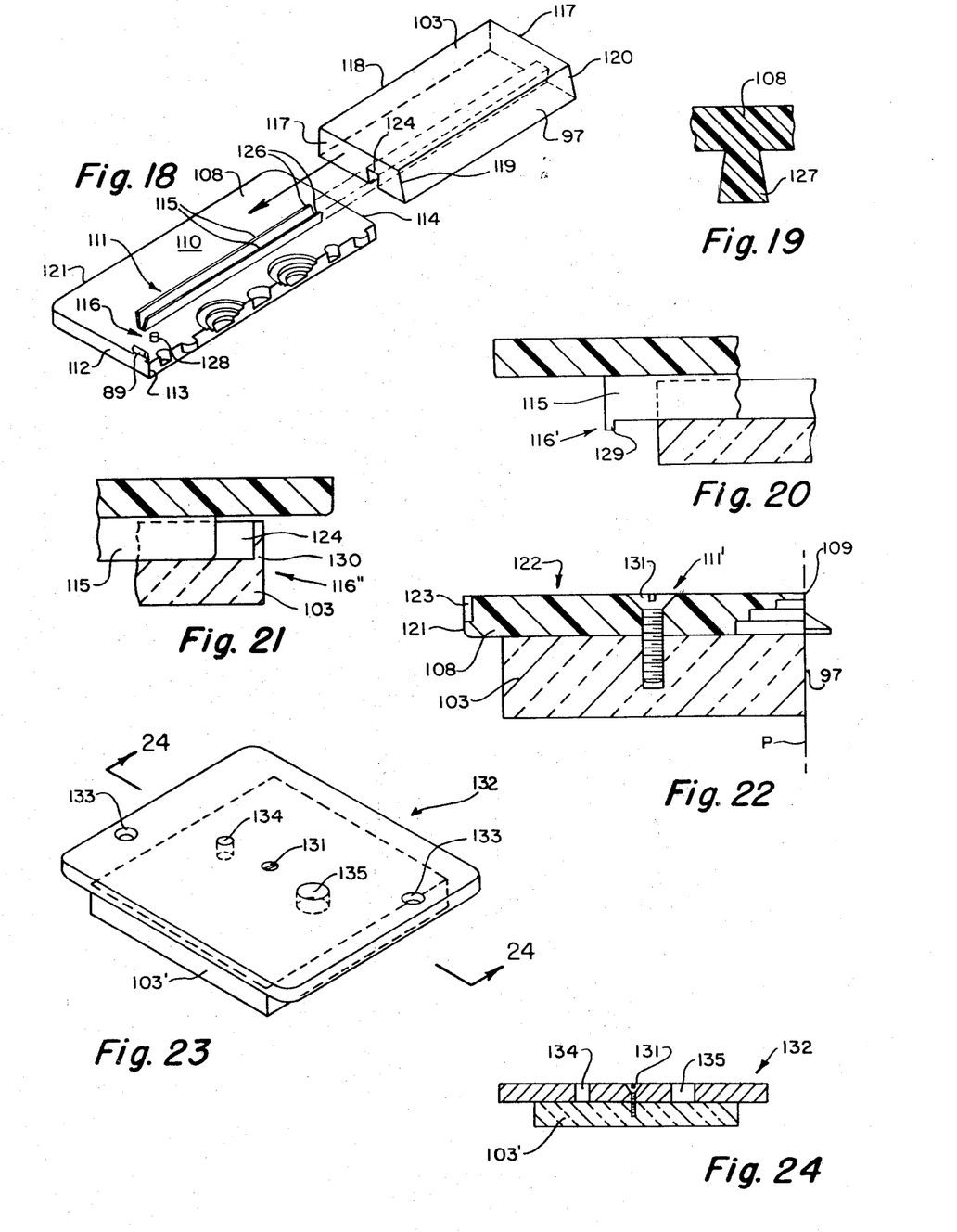
FIG. 18 is an exploded isometric view further illustrating one-half of the cover plate of FIG. 16.
FIG. 19 is a fragmentary cross-sectional view illustrating an alternative connector.
FIG. 20 is a fragmentary cross-sectional view as viewed, for example, from the line 20—20 of FIG. 17, illustrating alternative stop means.
FIG. 21 is a view similar to FIG. 20 illustrating a further alternative stop means.
FIG. 22 is a cross-sectional view illustrating alternative means for connecting the insulation block to the cover plate.
FIG. 23 is an isometric view illustrating a one-piece insulated cover plate.
FIG. 24 is a cross-sectional view taken along the line 24—24 of FIG. 23.

The flat members 108 of the cover 64' differ from the flat members 84 of the cover 64 (FIGS. 9 to 11) in several important respects. That is, each flat member 108 (FIG. 18) is provided with a single locking element 89 formed in an end wall 112 and adjacent to the straight wall end 113. The opposite end wall 114 is not provided with a locking element. Additionally, as shown in FIGS. 17 and 18, the securing means 111 is provided in part by the flat member 108 in the form of splayed flanges 115. Each flat member 108 is provided with stop means 116 (FIG. 18) for positioning the rigid insulation block segment 103 in proper position relative to the flat member 108.

Referring to FIG. 17, the insulation block segment 103 presents a flat face 97 and a perimeter face including opposite end faces 117 and a side face 118 which extend therearound between the opposite flat face ends 119, 120. The opposite end faces 117 and the side face 118 are inwardly offset from corresponding opposite end walls 112, 114 and the side wall 121 of the flat member 108, whereby the insulation block segments 103 may extend downwardly from the cover 64' through the access opening 75 of the support ring 65 (FIG. 13). It will be observed in FIG. 17 that the insulation blocks 103 cap the weakened areas 92. The insulation blocks 103 are cut away, when required, to expose only so much of the weakened areas 92 which is removed to permit passage of wiring as shown in FIGS. 6 and 7.

The flat face 97 of each insulation block 103 is preferably inclined outwardly from the plane P (FIG. 17) of the mating flat wall 88, at an angle L of at least 14 angular degrees.

Cover plates are known where other means are employed to retain the cover 64' within the support. As shown in FIG. 22, such a cover 122 may include a recess 123 formed, for example, in the side wall 121 of the flat member 108. The recess 123 is adapted to receive the tip of a tool, such as a screwdriver for prying up the cover 122 and pivoting the flat members 108 about the joining line 109. In the cover 122, the flat face 97 of the insulation block segment 103 may be substantially flush with the plane P.

Referring to FIG. 17, the connecting means 111 may comprise a keystone-shaped recess 124 formed in the upper surface 125 of the insulation block segment 103 and extend along the entire length thereof; and splayed flanges 115 which are formed integrally with the flat member 108 and extend downwardly from the lower face 110 thereof. The splayed flanges 115 may be provided with rounded ends 126 (FIG. 18) to facilitate introduction thereof into the keystone-shaped recess 124.

Alternatively, the flat member 56 may be provided with a keystone-shaped rib 127 (FIG. 19) adapted to fit within the keystone-shaped recess 124 without introducing stresses tending to fragment the insulation block segment 103.

The stop means 116 (FIG. 18) is provided for limiting the movement of the insulation block segment 103 along the splayed flanges 115 thereby positioning the insulation block segment 103 in proper position relative to the flat member 108. The stop means may take any one of a variety of forms. As shown in FIG. 18, the stop means 116 comprises a post 128 formed integrally with and extending outwardly from the lower face 110. The post 128 is disposed between the locking element 89 and the ends of the splayed flanges 115 and is thus positioned to be engaged by the end face 117 of the insulation block segment 103. Alternatively, stop means 116' (FIG. 20) is provided comprising a lug 129 formed at the end of one or both of the splayed flanges 115. As a further alternative, the stop means 116" (FIG. 21) may be provided on the insulation block segment 103 in the form of an end wall 130 which caps one end of the keystone-shaped recess 124 and is positioned to be engaged by the splayed flanges 115.

Alternatively, securing means 111' (FIG. 22) may be provided comprising a positive fastener 131 extending through the flat member 108 and threadedly engaged with the insulation block segment 103. It has been determined that the dovetail connection provided by the splayed flanges 115 in the keystone-shaped recess 124 of FIG. 17 and the connection provided by the positive fastener 131 (FIG. 22) operate equally well in retaining the insulation block segment 103 on the covers 64' (122) during fire conditions.

As an alternative arrangement, a one-piece cover 132 (FIGS. 23 and 24) may be employed having a one-piece insulation block 103' secured thereto by the positive fastener 131. The cover 132 may also be formed from metal or suitable heat-resistant plastics. Suitable countersunk openings 133 (FIG. 23) are provided which receive hold-down fasteners (not illustrated) for securing the cover 132 to the support. The cover 132 may be provided with openings 134, 135 for passage of electrical wiring. However, the insulation block 103' initially is imperforate. Openings corresponding to either or both of the openings 134, 135 are field formed in the insulation block 103' when wiring passageways are required.

We claim:

1. In a floor structure of the type comprising a metal subfloor providing generally parallel enclosed cells separated by lengthwise troughs; a covering layer of monolithic concrete supported by said metal subfloor; a housing disposed between said metal subfloor and said concrete, providing a chamber which includes a trough space and which communicates with one of said cells; and a layer of fireproofing material covering the lower surface of said metal subfloor; the improvement comprising:

said layer of fireproofing material having a thickness which is less than that required to provide said floor structure with a desired fire endurance when the housing is activated;

activating means for gaining access to said chamber and for reinstating said desired fire endurance of said floor structure without increasing said thickness of said layer of fireproofing material, said activating means including:

a passageway in said concrete extending between said upper surface of said concrete and said housing, providing access to said chamber, a removable cover supported in capping relation with said passageway, a rigid insulation block secured to said cover at a lower face thereof, said rigid insulation block being removably connected to said cover by a dovetail connection, and a heat shield positioned within said trough space.

2. The floor structure of claim 2 or 1 wherein said rigid insulation block comprises glass fiber board.

3. The floor structure of claim 1 wherein said cover comprises two parts having mating edges extending across said passageway to define a joining line, and said rigid insulation block comprises two segments, one carried by each of said parts.

4. The floor structure of claim 1 wherein said heat shield comprises a rigid gypsum board.

5. The floor structure of claim 1 wherein said activating means includes support means within said passageway supporting said cover, and grouting sealing the space between the perimeter of said support means and the peripheral wall of said concrete.

6. A two-piece insulated cover for an underfloor electrical housing, each piece of said cover comprising:
 a substantially flat member having a mating flat wall for mating with a like wall of the other flat member, opposite flat wall ends, a peripheral wall extending therearound between said opposite flat wall ends, and releasable locking means along said peripheral wall for locking said half part in an opening;
 an insulation block confronting a lower face of said flat member and having a flat face extending parallel to said mating flat wall, and a perimeter face extending therearound which is inwardly offset from said peripheral wall of said flat member; and
 securing means securing said insulation block to said flat member said securing means comprising a dovetail connection including a recess in said insulation block, and splayed flanges extending from said lower face of said flat member and engaged with said recess.

7. The cover of claim 6 including stop means engageable by said perimeter face of said insulation block determining the position of said insulation block relative to said flat member.

8. The cover of claim 6, or 7 wherein said releasable locking means includes a locking element adjacent to one of said opposite flat wall ends and extending downwardly from said peripheral wall of said flat member.

9. The cover of claim 6 including at least one weakened area extending inwardly from said mating flat wall and spaced inwardly from said flat wall ends to define a knockout.

10. The cover of claim 9 wherein said insulation block is disposed in capping relation with said weakened area.

11. The cover of claim 6 wherein said flat face is substantially flush with the plane of said mating flat wall.

12. A two-piece insulated cover for an underfloor electrical housing, each piece of said cover comprising:
 a substantially flat member having a mating flat wall for mating with a like wall of the other flat member, opposite flat wall ends, a peripheral wall extending therearound between said opposite flat wall ends, and releasable locking means along said peripheral wall for locking said half part in an opening;
 an insulation block confronting a lower face of said flat member and having a flat face extending parallel to said mating flat wall, and a perimeter face extending therearound which is inwardly offset from said peripheral wall of said flat member, said flat face of said insulation block being inclined outwardly from the plane of said mating flat wall; and
 securing means securing the said insulation block to said flat member.

* * * * *